(12) United States Patent
Robert

(10) Patent No.: US 8,483,393 B2
(45) Date of Patent: Jul. 9, 2013

(54) KEY MANAGEMENT SYSTEM FOR DIGITAL CINEMA

(75) Inventor: Arnaud Robert, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1045 days.

(21) Appl. No.: 11/883,702

(22) PCT Filed: Jan. 18, 2006

(86) PCT No.: PCT/US2006/001707
§ 371 (c)(1),
(2), (4) Date: Aug. 3, 2007

(87) PCT Pub. No.: WO2006/088596
PCT Pub. Date: Aug. 24, 2006

(65) Prior Publication Data
US 2008/0137869 A1    Jun. 12, 2008

Related U.S. Application Data

(60) Provisional application No. 60/653,154, filed on Feb. 15, 2005.

(51) Int. Cl.
*H04L 9/00* (2006.01)
*H04L 9/08* (2006.01)
*H04N 7/167* (2011.01)

(52) U.S. Cl.
USPC ............. 380/278; 380/44; 380/200; 380/228; 713/171

(58) Field of Classification Search
USPC ............... 380/27, 44, 200, 228, 278; 713/171
See application file for complete search history.

(56) References Cited

U.S. PATENT DOCUMENTS

| | | | | |
|---|---|---|---|---|
| 5,509,071 A | * | 4/1996 | Petrie et al. | 705/53 |
| 5,872,846 A | * | 2/1999 | Ichikawa | 380/282 |
| 2003/0007643 A1 | | 1/2003 | Ben-Zur et al. | |
| 2003/0198347 A1 | | 10/2003 | Ribes et al. | |
| 2003/0206635 A1 | | 11/2003 | Morley et al. | |
| 2003/0208766 A1 | | 11/2003 | Tanaka | |
| 2004/0240671 A1 | * | 12/2004 | Hu et al. | 380/277 |
| 2006/0126850 A1 | * | 6/2006 | Dawson et al. | 380/284 |

FOREIGN PATENT DOCUMENTS

| | | |
|---|---|---|
| JP | 2003-179841 | 8/1991 |
| JP | 3179841 | 8/1991 |
| JP | 6062402 | 3/1994 |
| JP | 2001/285824 | 10/2001 |

(Continued)

OTHER PUBLICATIONS

International Search Report, dated Apr. 13, 2007.

(Continued)

*Primary Examiner* — Mohammad W Reza
(74) *Attorney, Agent, or Firm* — Robert D. Shedd; Robert B. Levy

(57) ABSTRACT

Key management in a digital cinema system (10, 100 and 1000) occurs by encrypting a feature key associated with encrypted content with a transmission key exchanged with a decryption module (60, 601, 602, 6001, 6002, 6003 and 6004), that serves to decrypt encrypted content. The encrypted feature key undergoes transmission to the decryption module to enable decryption of the encrypted content. In this way, the decryption module will only have the capability of decrypting content based on that module's own key.

11 Claims, 2 Drawing Sheets

FOREIGN PATENT DOCUMENTS

| | | |
|---|---|---|
| JP | 2002/041483 | 8/2002 |
| JP | 2003/516052 | 5/2003 |
| JP | 2003/318876 | 11/2003 |
| JP | 2003-318876 | 11/2003 |
| WO | WO0131923 | 5/2001 |
| WO | WO2004/084035 | 9/2004 |
| WO | WO 2004/084036 | 9/2004 |

OTHER PUBLICATIONS

Morley, S.: "Special Edition of Digital Cinema: Approach to Digital Cinema: 4-1 Electronically Delivering Movies", Journal of Inst. of Image Inf. & TV Eng. Japan, Jul. 20, 2001, vol. 55, No. 7, pp. 956-959.

* cited by examiner

KEY MANAGEMENT SYSTEM FOR DIGITAL CINEMA

CROSS-REFERENCE TO RELATED APPLICATIONS

This application claims the benefit, under 35 U.S.C. §365 of International Application PCT/US2006/001707, filed Jan. 18, 2006 published in accordance with PCT Article 21(2) on Aug. 24, 2006 in English.

This application claims priority under 35 U.S.C. 119(e) to U.S. Provisional Patent Application Ser. No. 60/653,154, filed Feb. 15, 2005, the teachings of which are incorporated herein.

FIELD OF THE INVENTION

This invention relates to digital cinema, and more particularly, for a technique for distributing and managing keys that secure content in a digital cinema system.

BACKGROUND OF THE INVENTION

The term "Digital Cinema" refers generally to the creation and/or distribution of motion pictures in digital form, in contrast to traditional cinema whose content, including the image, sound track and subtitles, exists in an analog form on motion picture film. Digital cinema projection systems now exist and make use of a variety of technical solutions, rather than a single standardized solution embraced by all. Protection against copying remains the major concern of content owners (e.g., the motion picture studios) which has limited wide scale digital cinema deployment. The existence of content in digital form affords the opportunity to make perfect copies of the original content with little effort. For that reason various organizations, such as the Digital Cinema Initiative ("DCI") and the Society for Motion Picture Engineering ("SMPTE") have devoted much effort towards establishing specifications for digital cinema content distribution.

The DCI specification defines preferred solutions in many areas, such as encoding, distribution, and security. The SMPTE has sought to refine the DCI specification from a technical and implementation perspective. Within the area of security, key management plays a significant role. Key management refers to the management of the keys utilized to accomplish encryption of the digital content. The term, "encryption", as used throughout means either encryption or scrambling. Likewise, the term decryption means either decryption or descrambling. At the present time, the DCI and SMPTE specifications provide for key management using device certificates and a Trusted Device List ("TDL"). Each Security Entity ("SE"), that is, each device capable of accessing or manipulating the content, will hold a digital certificate provided by the manufacturer of the device; the certificate can be managed by either the manufacturer or an independent entity. The TDL lists trusted devices, e.g., content-receiving devices, such as digital projectors. More specifically, the TDL lists the respective digital certificate of each device that is trusted to manipulate a particular piece of content. A feature encryption key ("KF") undergoes transmission from the content owner, or an agent acting upon its behalf such as a distributor, to a Security Module ("SM") located in a theater authorized to display the content. The SM has the responsibility for making sure that only devices explicitly referenced in the TDL access or learn of the KF.

This scheme has several disadvantages. First, no link necessarily exists between the issuer of the TDL and the issuer of the certificate(s), which introduces a security weakness. Conceivably, an outsider could manage to issue certificates to uncertified devices, and could manage to have such uncertified devices listed in a TDL. Second, the Security Module (SM), which typically resides outside the control of the content rights owner and the exhibitor, serves as the sole entity responsible for ensuring that the feature keys only get distributed to trusted devices. Under such circumstances, a hacker could manipulate the SM in such a way to permit transmission of feature keys to devices outside the TDL. Third, with the SM responsible for the KF management in a theater, a hacker could manipulate the SM to get access to the KF. Since the content resides in digital form, access to KF would allow the hacker to access the content and redistribute it virtually free of losses Thus, a need exists for a key management process that maintains the feature key confidential to those devices that actually perform decryption of the content.

SUMMARY OF THE INVENTION

Brief in accordance with the present principles, there is provided a technique for key management, and in practice, key management for digital cinema content. The method commences by encrypting a feature key associated with encrypted content with a transmission key exchanged with a decryption module. Typically, although not necessarily, the decryption module resides at a theater or similar facility at which encrypted content undergoes decryption in accordance with a key for subsequent presentation. The encrypted feature key undergoes transmission to the decryption module to enable decryption of the encrypted content. In this way, the decryption module will only have the capability of decrypting content based on that module's own key.

DETAILED DISCLOSURE

Figure 1:
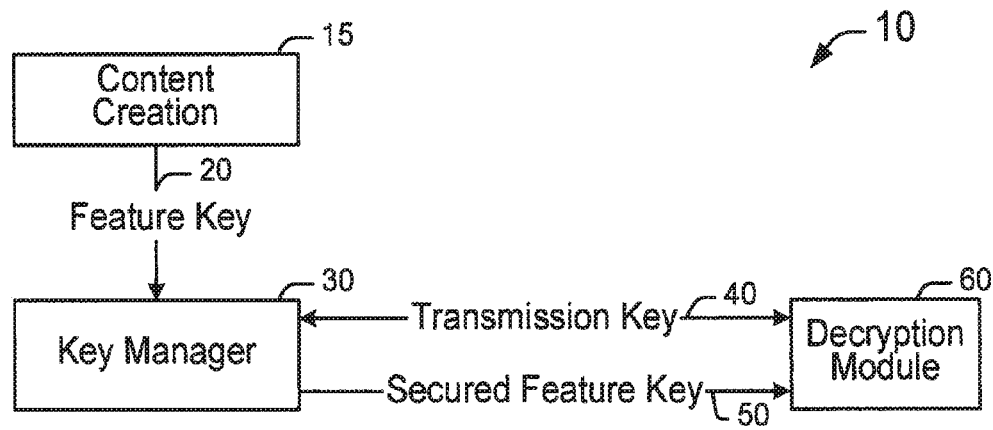
FIG. 1 depicts a simplified block diagram of a system for practicing the key management technique of the present principles for a single decryption module in a single exhibition facility.

FIG. 1 depicts a block schematic diagram of a system 10 for providing key management in accordance with a first embodiment of the present principles. At the outset of the key management process, a content creator, such as a movie studio, engages in content creation, represented by block 15 in FIG. 1. The created content resides in digital form, whether as a result of initial creation using digital capture devices or the result of conversion into digital of images initially captured on film. The content creator or its agent will encrypt the content in digital form using any one of a number of well known techniques that require the use of a key, depicted in FIG. 1 as feature key 20, to decrypt the content.

A key manager 30 receives the feature key 20. It further agrees to a transmission key 40 with a decryption module 60 typically associated with a digital cinema projector located at an exhibition facility such as a movie theater or the like (not shown). Either the key manager or decryption module will initiate the exchange of the transmission key 40. Typically, the key manager 30 takes the form of a programmed digital computer, or dedicated logic having the ability to encrypt and/or decrypt one type of key using another key. The key manager 30 encrypts the feature key 20 with the transmission key 40, yielding a secure feature key 50 which is sent to the decryption module 60. The decryption module 60 utilizes the negotiated transmission key 40 to derive the feature key 20, and further decrypt encrypted content to permit display.

The key management technique practiced by the system 10 described above affords the advantage of increased security. The process of encrypting the content feature key 20 with the transmission key 40 from the decryption module 60 makes the feature key 20 more difficult to intercept. Moreover, the secure feature key 50 utilized by the decryption module 60 remains uniquely associated with the decryption module, greatly reducing the likelihood that secure feature key, even if hacked, would enable another decryption module to properly decrypt a piece of encrypted content.

Figure 2:
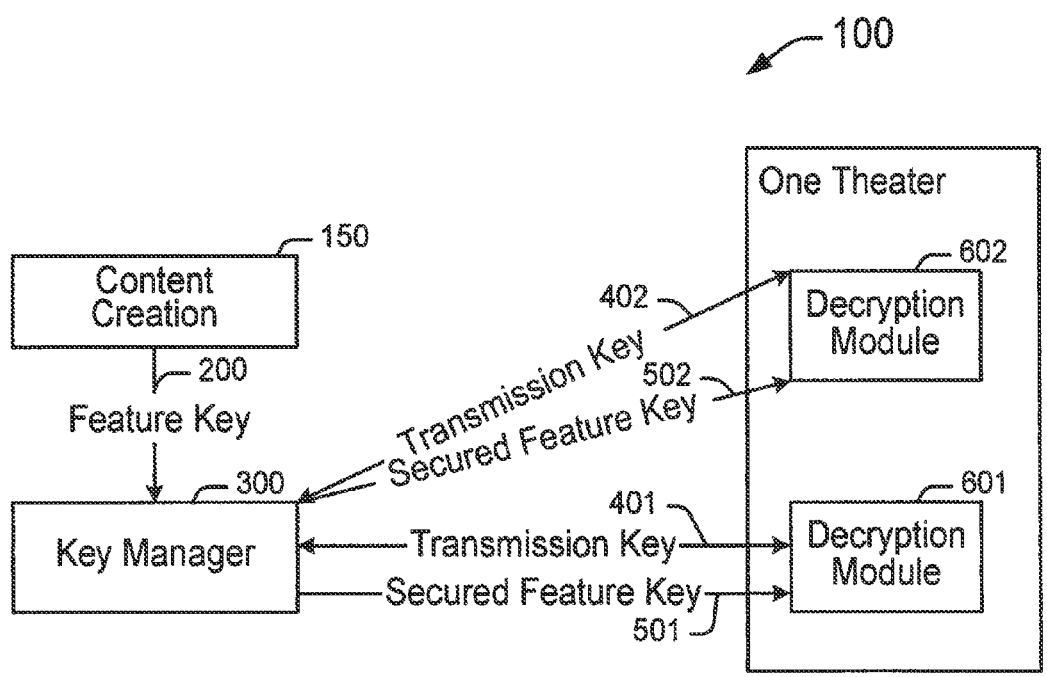
FIG. 2 depicts a simplified block diagram of a system for practicing the key management technique of the present principles for multiple of decryption modules in a single exhibition facility.

FIG. 2 depicts a block schematic diagram of a system 100 for providing key management in accordance with a second embodiment of the present principles. At the outset of the key management process, a content creator, such as a movie studio, engages in content creation, represented by block 150 in FIG. 2. The created content resides in digital form, whether as a result of initial creation using digital capture devices or the result of conversion into digital of images initially captured on film. The content creator or its agent will encrypt the content in digital form using any one of a number of well known techniques that require the use of a key, depicted in FIG. 2 as feature key 200 to decrypt the content.

A key manager 300 receives the feature key 200 from the content creator. The key manager 300 of FIG. 2 will exchange transmission keys 401 and 402 with each of decryption modules 601 and 601, both located at the same exhibition facility, but each module associated with a different digital cinema projector (not shown). Either the key manager or each decryption module will initiate the exchange. Like the key manager 30 of FIG. 1, the key manager 300 takes the form of a programmed digital computer, or dedicated logic having the ability to encrypt one type of key using another key. The key manager 300 of FIG. 2 encrypts the feature key 200 separately with each of the transmission keys 401 and 402 from the decryption modules 601 and 602, respectively, to yield secure feature keys 501 and 502, respectively. Each of the decryption modules 601 and 602 utilizes its corresponding one of transmission keys 401 and 402, respectively, to access the feature key 200 and further decrypt encrypted content to permit display.

In comparison to the key management system 10 of FIG. 1 which performs encryption of the feature key 20 with the transmission 40 associated with the single decryption module 60, the key manager 300 of FIG. 2 separately encrypts the feature key 200 with the transmission key of the different decryption modules 601 and 602 to yield the separate secured feature keys 501 and 502, respectively. Each of the separate secured feature keys 501 and 502 will only function with a corresponding one of the decryption modules 601 and 602. With the key management system 100 of FIG. 2, a theater operator cannot use the same secure feature key with more than one decryption module to violate established security safeguards.

Figure 3:
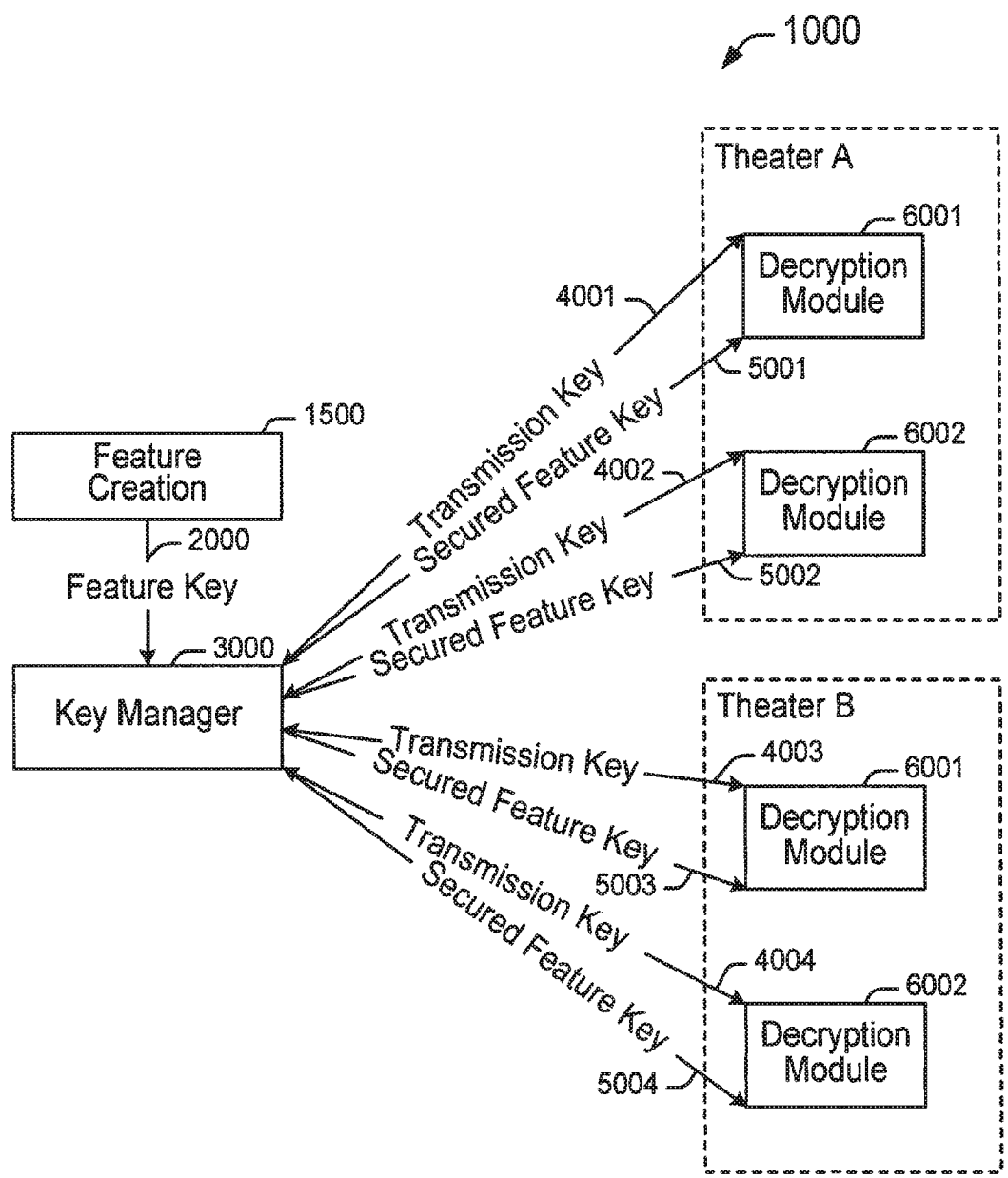
FIG. 3 depicts a simplified block diagram of a system for practicing the key management technique of the present principles for a multiple decryption modules in multiple exhibition facilities.

The key manager 300 of FIG. 2 can also exchange different feature keys (such as the key feature 200) with each of the decryption modules 601 and 602. In such a case, the key manager 300 would utilize the transmission key 401 to encrypt a feature key 201 (not shown) yielding in a secured feature key (not shown) in place of the secured feature key 501) and send it to the decryption module 601; the later would use its transmission key 401 to decrypt this secured feature key, obtain the feature key 201, and decrypt encrypted content to permit display. Similarly, the key manager 300 would encrypt a second feature key 202 (not shown) using the transmission key 402 yielding a secure feature key (not shown) in place of key the secured feature key 502). The key manager 300 would send this secured feature key to the decryption module 602 who would use its transmission key 402 to decrypt the secured feature key 504, obtain the feature key 202, and decrypt encrypted content to permit display FIG. 3 depicts a block schematic diagram of a system 1000 for providing key management in accordance with a third embodiment of the present principles. At the outset of the key management process, a content creator, such as a movie studio, engages in content creation, represented by block 1500 in FIG. 3. The created content resides in digital form, whether as a result of initial creation using digital capture devices or the result of conversion into digital of images initially captured on film. The content creator or its agent will encrypt the content in digital form using any one of a number of well known techniques that require the use of a key, depicted in FIG. 3 as feature key 2000 to decrypt the content.

A key manager 3000 receives the feature key 2000 from the content creator. The key manager 3000 of FIG. 3 exchange transmission keys 4001-4004 with decryption modules 6001-6004, respectively. In the illustrated embodiment of FIG. 3, the decryption modules 6001 and 6002 reside at a first exhibition facility (Theater A) whereas the decryption modules 6003 and 6004 reside at a second exhibition facility (Theater B). Alternatively, each of the decryption modules 6001-6004 could reside at separate exhibition facilities. The number of exhibition facilities and the number decryption modules at each such facility can vary without adversely affecting the key management technique of the present principles. Either the key manager or decryption module will initiate the exchange. If the key manager initiates the exchange, the key manager system typically will send to each decryption module a unique identifier of at least one expected decryption recipient.

Like the key manager 300 of FIG. 2, the key manager 3000 of FIG. 3 takes the form of a programmed digital computer, or dedicated logic having the ability to encrypt one type of key using another key. The key manager 3000 of FIG. 3 encrypts the feature key 2000 separately with each of the transmission keys 4001-4004 from the decryption modules 6001-6004, respectively, to yield secure feature keys 5001-5004, respectively. Each of the decryption modules 6001-6004 uses its corresponding one of secured feature keys 5001-5004, respectively, to decrypt encrypted content to permit display.

Just as the key manager 300 of FIG. 2 separately encrypts the feature key 200 with the transmission keys 401 and 402 to yield the separate secure feature keys 501 and 502, respectively, the key manager 3000 of FIG. 3 encrypts the feature key 2000 separately with each of the transmission keys 4001-4004, respectively, to yield secure feature keys 5001-5004, respectively. In each instance, each decryption module receives a secure feature key unique to that module. Thus, the key management system 1000 of FIG. 3, like the key management system 100 of FIG. 2 prevents a theater operator from using the same secure feature key with more than one decryption module to violate established security safeguards.

In the event that two or more decryption modules serve to decrypt the same feature, a key manager, such as key manager 300 of FIG. 2 or key manager 3000 of FIG. 3 could provide the same feature key, provided that such decryption modules each provide the key manager with a common transmission key. Otherwise, the key manager will provide a separate secure feature key to each decryption module.

In each of key management systems 10, 100 and 1000 of FIGS. 1-3, respectively, transmission of the feature key to the key manager occurs in a secure manner. As discussed, each key manager creates individual secured feature key(s) by encrypting the feature key with the transmission key associated with each decryption module destined to eventually decrypt content, including any spare or back-up decryption module.

In practice, the feature keys, 20, 200 and 2000 each comprise a single symmetrical key. The feature key exchange between the feature creation system and key manager typically occurs using a cryptographic symmetrical algorithm based on a shared secret. The feature key exchange between the feature creation system and the key manager can also be secured using an asymmetrical cryptographic algorithm based on the secret/public key pair of the key manager, or using a secured authenticated channel or a private modem line.

Similarly, the feature key exchange between the key manager and the decryption module(s) typically occurs using a cryptographic symmetrical algorithm based on a shared secret, provided the key manager and the decryption module were able to mutually authenticate each other in a cryptographic sense. The feature key exchange between the key manager and the decryption module can be secured using an asymmetrical cryptographic algorithm based on the secret/public key pair of the decryption module, provided the key manager was able to securely authenticate the decryption module.

Various alternatives exist for encrypting content, such as using a digital envelope or asymmetrical keys. Moreover, content encryption can occur using multiple keys, rather than a single key, with each key typically, although not necessarily, associated with a temporal segment of the feature. Various methods exist for segmenting the content to enable the use of multiple keys, such as segmenting the feature into N consecutives segment, where N is greater than one. If multiple feature encryption keys are utilized, the system described at FIG. 1 can be modified to optimize operations, both at the system and the feature decryption levels. For example, as illustrated in FIG. 1, the key management system 30 could first encrypt the feature keys with a master key, encrypt the master key with the transmission key 40 (the transmission key could be the public key of the decryption module or a symmetrical key exchanged between the key manager and the decryption module), and send both results to the decryption module 60. Content encryption also can occur using asymmetrical scrambling or encryption algorithms. Further, the content can undergo super-scrambling or super-encrypted using an additional key, e.g. the feature is first encrypted by the feature key, and then by the additional key (or vice versa). Content encryption can also occur using a key that is derived from the feature key and other information, such as but not limited to, the identity of the key management system, the decryption module, the time, the date, and/or any combination thereof.

In a preferred embodiment, the transmission key comprises the public key of the decryption module as provided by an asymmetrical cryptography key pair. The transmission key can change periodically, randomly, or on-demand.

Each decryption module sends its public key to the key manager. Such transmission can occur individually (i.e. each decryption module has a direct connection to the key manager). Alternatively, a group of decryption modules, e.g. all decryption modules at a single exhibition facility, could send their respective public keys within a single message to the key management system. The communication link could comprise a wireless or wired channel. Alternatives to the asymmetrical approach for the transmission key could include using a pre-agreed upon symmetrical key, a MAC-based method, and so on. The key management technique of the present principles affords the advantage of securing the features encryption key in such a way the latter is only accessible the decryption module level and by no other intermediary modules.

Each of decryption modules 60, 601-602 and 6001-6004 has an association with a physical device at the exhibition facility, for example but not limited to, a Security Module (not shown), a projector (not shown), a content processing device (not shown), and so on. The actual location of the decryption module has no bearing on the key management technique of the present principles. What remains necessary is that each decryption module has its identity known to the key manager and both must have the ability to exchange transmission keys with each other. Although depicted separately, the key management system could exist as part of a physical device in the theater (as described above) or could exist as part of the content creation system.

The decryption module need not possess a direct communication link to the key manager. In such a case, a relay entity, for example the Theater Management System or the Security Module (not shown), as described in the DCI and SMPTE documents (incorporated by reference herein), could capture the messages from the key manager, and relay them to the appropriate decryption module.

The foregoing describes a technique for managing keys in connection with decryption of encrypted content.

The invention claimed is:
1. A key management method, comprising the steps of:
encrypting a feature key associated with encrypted content with each of a plurality of transmission keys collectively received as single message group from corresponding decryption modules at a key manager that performs the encryption, to yield a plurality of secured feature keys; and
providing a separate one of the plurality of secured feature keys to a corresponding one of the decryption modules to enable decryption of the encrypted content.
2. The method according to claim 1 wherein the providing step further comprises the step of providing the secure feature keys over secure transmission channels.
3. The method according to claim 1 wherein the providing step further comprises the step of providing the secure feature keys over secure wireless transmission channels.
4. A key manager system for receiving a feature key from a feature creation system and for distributing secure feature keys to decryption modules, comprising,
a key manager in the form of a digital computer (1) encrypting a feature key from the feature creation system with each of a plurality of transmission keys collectively received as single message group from corresponding decryption modules to yield a plurality of secure feature keys and (2) providing a separate one of the plurality of secured feature keys to a corresponding one of decryption module to enable decryption of the encrypted content.
5. The system of claim 4 wherein the content is encrypted using one of an asymmetrical or a symmetrical scrambling or encryption algorithm.

6. The system of claim 4 wherein the key manager system sends to the decryption module a unique identifier of at least one expected decryption recipient.

7. The system of claim 4 wherein the feature key is secured using a symmetrical encryption or scrambling algorithm utilizing a key shared between the key manager and the decryption module.

8. The system of claim 4 wherein the feature key is secured using an asymmetrical encryption algorithm based on the secret/public key of the key manager.

9. The system of claim 4 wherein the feature key is secured using an asymmetrical encryption algorithm based on a secret/public key of the decryption module.

10. The system of claim 4 wherein the feature key is secured using an asymmetrical cryptographic based secret/public key pair generated in accordance with the transmission key and other information.

11. The system of claim 4 wherein distribution of the secured feature key occurs over a secured channel.

\* \* \* \* \*